US011955083B2

(12) United States Patent
Lee et al.

(10) Patent No.: US 11,955,083 B2
(45) Date of Patent: Apr. 9, 2024

(54) DISPLAY DEVICE

(71) Applicant: Samsung Display Co., Ltd., Yongin-Si (KR)

(72) Inventors: Jaewoo Lee, Yongin-si (KR); Yongsu Lee, Yongin-si (KR); Seung-Jun Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/138,123

(22) Filed: Apr. 24, 2023

(65) Prior Publication Data

US 2024/0005867 A1 Jan. 4, 2024

(30) Foreign Application Priority Data

Jul. 4, 2022 (KR) ........................ 10-2022-0081820

(51) Int. Cl.
*G09G 3/3258* (2016.01)

(52) U.S. Cl.
CPC ... *G09G 3/3258* (2013.01); *G09G 2300/0819* (2013.01); *G09G 2300/0861* (2013.01); *G09G 2310/0202* (2013.01); *G09G 2310/08* (2013.01); *G09G 2320/0238* (2013.01)

(58) Field of Classification Search
CPC ......... G09G 3/3258; G09G 2300/0819; G09G 2300/0861; G09G 2310/0202; G09G 2310/08; G09G 2320/0238
See application file for complete search history.

(56) References Cited

U.S. PATENT DOCUMENTS 8,797,314 B2 * 8/2014 Chung .................... G09G 3/325
345/212
11,211,013 B2 12/2021 Kim et al.
2010/0085348 A1 4/2010 Bae et al.
2016/0055792 A1 * 2/2016 Lee ...................... G09G 3/3233
315/173

FOREIGN PATENT DOCUMENTS

KR 10-1547565 B1 9/2015
KR 10-2021-0086295 A 7/2021

* cited by examiner

*Primary Examiner* — Michael Pervan
(74) *Attorney, Agent, or Firm* — Innovation Counsel LLP

(57) ABSTRACT

A display device is disclosed that includes a display panel including a pixel and a scan driver to provide a first scan signal to a third scan signal to the pixel. The pixel includes a light emitting element, a first transistor connected between a first voltage line and the light emitting element, a second transistor connected between a data line and a first node, a gate electrode of the second transistor to receive a first scan signal, a third transistor connected between the second node and the first transistor, a gate electrode of the third transistor to receive a second scan signal, and a fourth transistor connected between a first initialization voltage line, which is to receive a first initialization voltage, and the second node, a gate electrode of the fourth transistor to receive a third scan signal. The first to third scan signals include first to third activation sections, and the first to third activation sections have an equal duration.

20 Claims, 13 Drawing Sheets

DISPLAY DEVICE

CROSS-REFERENCE TO RELATED APPLICATIONS

This application claims priority under 35 U.S.C. § 119 to Korean Patent Application No. 10-2022-0081820 filed on Jul. 4, 2022, in the Korean Intellectual Property Office, the disclosures of which are incorporated by reference herein in their entireties.

BACKGROUND

The present disclosure relates to a display device, and more particularly, relates to a display device having a non-display region reduced in width.

A light emitting display device displays an image by using a light emitting diode that generates light through the recombination of electrons and holes. The light emitting display device has a rapid response speed and is driven with lower power consumption.

The light emitting display device includes pixels connected to data lines and scan lines. Each pixel typically includes a light emitting diode and a circuit unit to control an amount of current flowing through the light emitting diode. The circuit unit controls an amount of current, in response to a data signal, such that the current passes through the light emitting diode between a first driving voltage and a second driving voltage. In this case, light having specific brightness is generated to correspond to the amount of current flowing through the light emitting diode.

SUMMARY

Embodiments of the present disclosure may provide a display device capable of preventing the width of a non-display region from being increased by reducing the number of scan drivers.

According to an embodiment, a display device includes a pixel and a scan driver to provide a first scan signal to a third scan signal to the pixel.

The pixel includes a light emitting element, a first transistor connected between a first voltage line and the light emitting element, a first capacitor connected between the first voltage line and a first node, a second capacitor between the first node and a second node, a second transistor connected between a data line and the first node, a gate electrode of the second transistor to receive a first scan signal from the scan driver, a third transistor connected between the second node and the first transistor, a gate electrode of the third transistor to receive a second scan signal from the scan driver, a fourth transistor connected between a first initialization voltage line, which is to receive a first initialization voltage, and the second node, a gate electrode of the fourth transistor to receive a third scan signal from the scan driver.

The first scan signal includes a first activation section, the second scan signal includes a second activation section, and the third scan signal includes a third activation section. The first to third activation sections have an equal duration.

BRIEF DESCRIPTION OF THE FIGURES

The above and other features of the present disclosure will become apparent by describing in detail embodiments thereof with reference to the accompanying drawings.

DETAILED DESCRIPTION

Figure 1:
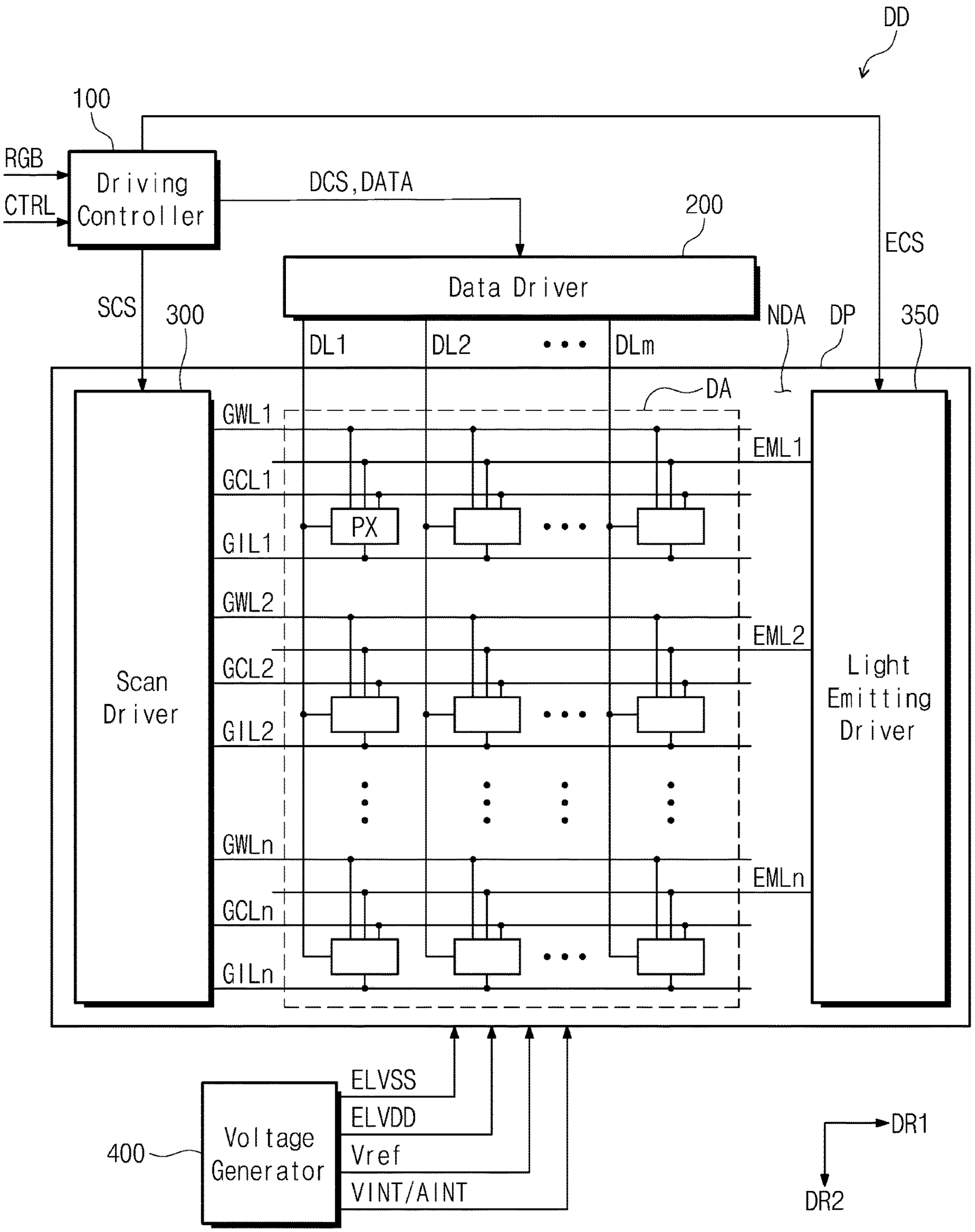
FIG. 1 is a block diagram of a display device, according to an embodiment of the present disclosure.

In the specification, the expression that a first component (or area, layer, part, portion, etc.) is “on”, “connected with”, or “coupled to” a second component means that the first component is directly on, connected with, or coupled to the second component or means that a third component is interposed therebetween.

The same reference numeral refers to the same component. In addition, in drawings, thicknesses, proportions, and dimensions of components may be exaggerated to describe the technical features effectively.

Although the terms “first”, “second”, etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

Also, the terms “under”, “below”, “on”, “above”, etc. are used to describe the correlation of components illustrated in drawings. The terms are relative and are described with reference to a direction indicated in the drawing.

It will be understood that the terms “include”, “comprise”, “have”, etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device, according to an embodiment of the present disclosure.

Referring to FIG. 1, a display device DD may be a device activated in response to an electrical signal to display an image. The display device DD may be applied to an electronic device, such as a smart watch, a tablet PC, a laptop, a computer, or a smart television.

The display device DD includes a display panel DP, and a panel driver to drive the display panel DP. According to an embodiment of the present disclosure, the panel driver may include a driving controller 100, a data driver 200, a scan driver 300, a light emitting driver 350, and a voltage generator 400.

The driving controller 100 receives an image signal RGB and a control signal CTRL. The driving controller 100 generates image data DATA by transforming a data format of the image signal RGB to be matched to the interface specification of the data driver 200. The driving controller 100 outputs a scan control signal SCS, a data control signal DCS, and a light emitting driving control signal ECS.

The data driver 200 receives a data control signal DCS and the image data DATA from the driving controller 100. The data driver 200 transforms the image data DATA into data signals and then outputs the data signals to a plurality of data lines DL1 to DLm to be described later. The data signals are analog voltages corresponding to a grayscale value of the image data DATA.

The voltage generator 400 generates voltages necessary for an operation of the display panel DP. According to an embodiment of the present disclosure, the voltage generator 400 generates a first driving voltage ELVDD, a second driving voltage ELVSS, a reference voltage Vref, and first and second initialization voltages VINT and AINT. The reference voltage Vref may have a voltage level lower than that of the first driving voltage ELVDD. The first and second initialization voltages VINT and AINT may have different voltage levels.

The scan driver 300 receives the scan control signal SCS from the driving controller 100. The scan control signal SCS may include a commencement signal and a clock signal for commencing an operation of the scan driver 300. The scan driver 300 generates a plurality of scan signals and sequentially outputs the plurality of scan signals to scan lines to be described later. The light emitting driver 350 may output the light emitting control signals to light emitting control lines EML1 to EMLn, in response to the light emitting driving control signal ECS from the driving controller 100. According to an embodiment, the scan driver 300 and the light emitting driver 350 may be integrally implemented into one circuit.

The scan driver 300 outputs initialization scan signals to initialization scan lines GIL1 to GILn of the display panel DP and outputs compensating scan signals to compensating scan lines GCL1 to GCLn of the display panel DP. The scan driver 300 outputs write scan signals to write scan lines GWL1 to GWLn of the display panel DP.

The display panel DP includes the initialization scan lines GIL1 to GILn, the compensating scan lines GCL1 to GCLn, the write scan lines GWL1 to GWLn, the light emitting control lines EML1 to EMLn, the data lines DL1 to DLm, and pixels PX. The display panel DP may include a display region DA and a non-display region NDA. The initialization scan lines GIL1 to GILn, the compensating scan lines GCL1 to GCLn, the write scan lines GWL1 to GWLn, and the light emitting control lines EML1 to EMLn extend in a first direction DR1 and are arranged while being spaced apart from each other in a second direction DR2. The data lines DL1 to DLm extend in the second direction DR2 and are arranged while being spaced apart from each other in the first direction DR1.

The scan driver 300 and the light emitting driver 350 may be disposed in the non-display region NDA of the display panel DP. According to an embodiment of the present disclosure, the scan driver 300 is adjacent to one side of the display region DA, and the light emitting circuit 350 is adjacent to another side of the display region DA, which is opposite to the one side. According to an embodiment illustrated in FIG. 1, the scan driver 300 and the light emitting circuit 350 are disposed at both sides of the display region DA, but the present disclosure is not limited thereto. The scan driver 300 and the light emitting driver 350 may be disposed to be adjacent to one of the one side and the another side of the display panel DP.

The plurality of pixels PX are connected to the initialization scan lines GIL1 to GILn, the compensating scan lines GCL1 to GCLn, the write scan lines GWL1 to GWLn, the light emitting control lines EML1 to EMLn, and the data lines DL1 to DLm. Each of the plurality of pixels PX may be electrically connected to three scan lines and one light emitting control line. For example, as illustrated in FIG. 1, a first row of pixels may be connected to the first initialization scan line GIL1, the first compensating scan line GCL1, the first write scan line GWL1, and the first light emitting control line EML1. In addition, a second row of pixels may be connected to the second initialization scan line GIL2, the second compensating scan line GCL2, the second write scan line GWL2, and the second light emitting control line EML2. However, the number of scan lines and light emitting control lines, which are connected to each pixel PX, is not limited thereto, but the number of scan lines and the number of light emitting control lines may be variable.

According to an embodiment of the present disclosure, the first compensating scan line GCL1 may be electrically connected to the second initialization scan line GIL2, and the first write scan line GWL1 may be electrically connected to the second compensating scan line GCL2 and the third initialization scan line GIL3. A first scan signal output through a first output terminal of the scan driver 300 is supplied to the first initialization scan line GIL1 while functioning as the first initialization scan signal. Second scan signals output through a second output terminal of the scan driver 300 are supplied to the first compensating scan line GCL1 and the second initialization scan line GIL2, while functioning as the first compensating scan signal and the second initialization scan signal. Third scan signals output through a third output terminal of the scan driver 300 are supplied to the first write scan line GWL1, the second compensating scan line GCL2 and the third initialization scan line GIL3, while functioning as the first write scan signal, the second compensating signal, and the third initialization scan signal.

Accordingly, although three scan lines are connected to each pixel PX, the three scan lines may receive the three scan signals which are output from one scan driver 300 and function as an initialization scan signal, a compensating scan signal, and a write scan signal.

Each of the plurality of pixels PX includes a light emitting element ED (see FIG. 2) and a pixel circuit unit PXC (see FIG. 2) to control a light emitting operation of the light emitting element ED. The pixel circuit unit PXC may include at least one transistor and at least one capacitor. The scan driver 300 and the light emitting driver 350 may be directly formed in the non-display region NDA of the display panel DP, through the same process of forming the transistors of the pixel circuit unit PXC.

Each of the plurality of pixels PX receives the first driving voltage ELVDD, the second driving voltage ELVSS, the reference voltage Vref, and the first and second initialization voltages VINT and AINT from the voltage generator 400.

Figure 2:
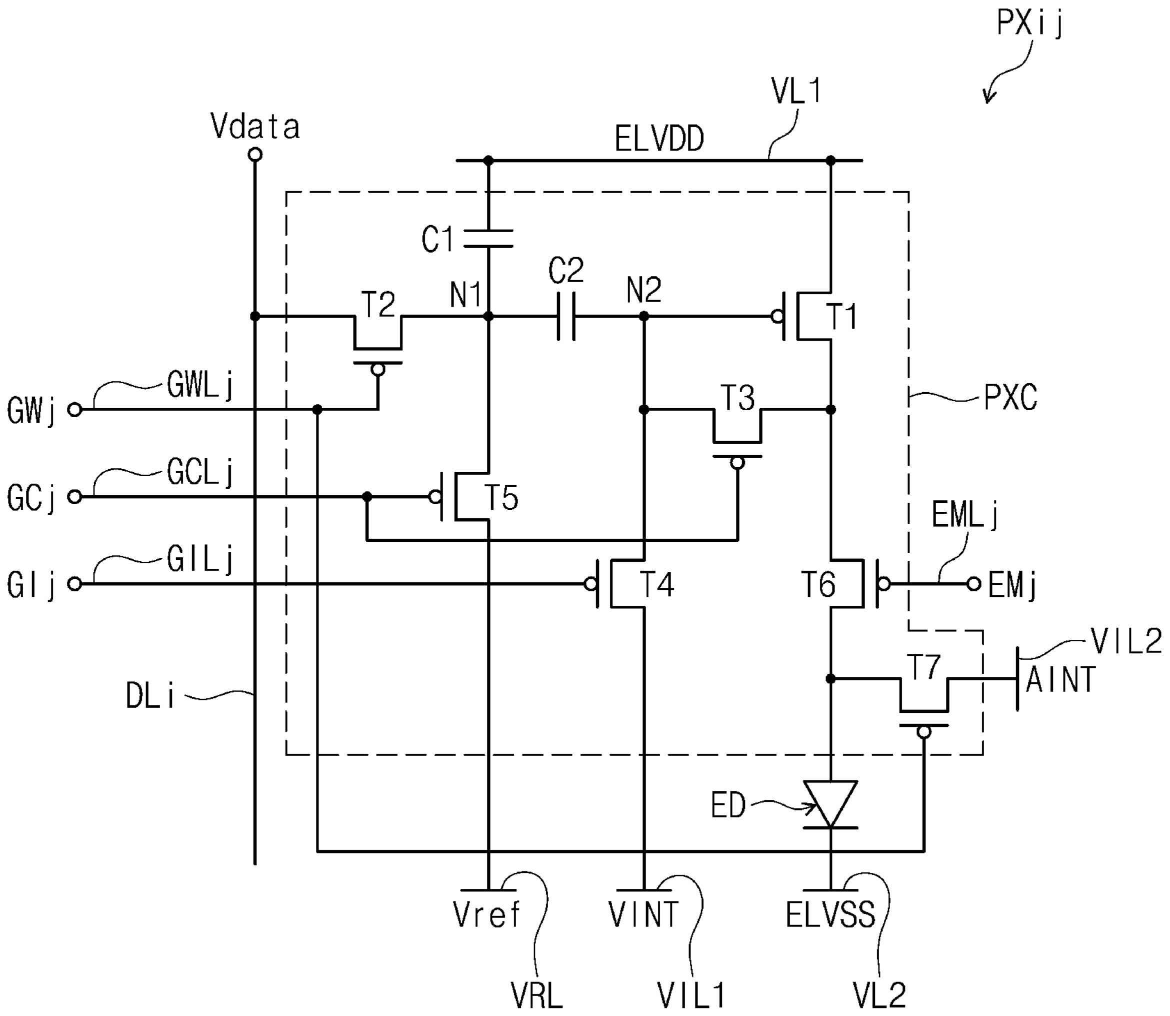
FIG. 2 is a circuit diagram of a pixel, according to an embodiment of the present disclosure.

FIG. 2 is a circuit diagram of a pixel, according to an embodiment of the present disclosure. Each of the plurality of pixels PX illustrated in FIG. 1 may have the same configuration. Accordingly, the following description will be made with reference to FIG. 2 while focusing on a configuration of one pixel PXij of pixels PX, and the description about the remaining pixels will be omitted below.

The pixel PXij is connected to a j-th initialization scan line GILj of the initialization scan lines GIL1 to GILn, a j-th compensating scan line GCLj of the compensating scan lines GCL1 to GCLn, and a j-th write scan line GWLj of the write scan lines GWL1 to GWLn. In addition, the pixel PXij is connected to an i-th data line DLi of the data lines DL1 to DLm illustrated in FIG. 1, and a j-th light emitting control line EMLj of the light emitting control lines EML1 to EMLn.

Referring to FIG. 2, the pixel PXij according to an embodiment includes the pixel circuit unit PXC and the light emitting element ED. According to an embodiment of the present disclosure, the pixel circuit unit PXC may include seven transistors and two capacitors. Hereinafter, the seven transistors are referred to as first to seventh transistors T1, T2, T3, T4, T5, T6, and T7, respectively, and two capacitors are referred to as first and second capacitors C1 and C2.

According to an embodiment, each of the first to seventh transistors T1 to T7 may be P-type transistors having a low-temperature polycrystalline silicon (LTPS) semiconductor layer. Alternatively, each of the first to seventh transistors T1 to T7 may be an N-type transistor. In addition, at least one of the first to seventh transistors T1 to T7 may be an N-type transistor, and the remaining transistors may be P-type transistors. In addition, at least one of the first to seventh transistors T1 to T7 may be a transistor having an oxide semiconductor layer. For example, some of the first to seventh transistors T1 to T7 may be oxide semiconductor transistors, and and remaining transistors may be an LTPS transistor.

According to the present disclosure, the circuit configuration of the pixel PXij is not limited to the circuit configuration illustrated in FIG. 2. The pixel PXij illustrated in FIG. 2 is provided only for the illustrative purpose, and the circuit configuration of the pixel PXij may be modified and implemented.

The j-th initialization scan line GILj supplies a j-th initialization scan signal GIj (which may be referred to as a third scan signal) to the pixel PXij, the j-th compensating scan line GCLj supplies a j-th compensating scan signal PXij (which may be referred to as a second scan signal) to the pixel PXij, and the j-th write scan line GWLj supplies a j-th write scan signal GWj (which may be referred to as a first scan signal) to the pixel PXij. The j-th light emitting control line EMLj supplies a j-th light emitting control signal EMJ to the pixel PXij, and the i-th data line DLi transmits an i-th data voltage Vdata to the pixel PXij. The i-th data voltage Vdata may have a voltage level corresponding to the image signal RGB input to the display device DD (see FIG. 1).

The pixel PXij may be connected to a first voltage line VL1, a second voltage line VL2, a reference voltage line VRL, and first and second initialization voltage lines VIL1 and VIL2. The first voltage line VL1 transmits the first driving voltage ELVDD, which is supplied from the voltage generator 400 illustrated in FIG. 1, to the pixel PXij, and the second voltage line VL2 transmits the second driving voltage ELVSS, which is supplied from the voltage generator 400, to the pixel PXij. The reference voltage line VRL may transmit the reference voltage Vref supplied from the voltage generator 400 to the pixel PXij. The first and second initialization voltage lines VIL1 and VIL2 receive the first and second initialization voltages VINT and AINT from the voltage generator 400, respectively, and transmit the received first and second initialization voltages VINT and AINT to the pixel PXij.

The first capacitor C1 is connected between a first node N1 and the first voltage line VL1, and the second capacitor C2 is connected between the first node N1 and a second node N2. The first capacitor C1 includes a first electrode electrically connected to the first voltage line VL1 and a second electrode electrically connected to the first node N1, and the second capacitor C2 includes a first electrode electrically connected to the first node N1 and a second electrode electrically connected to the second node N2.

Each of the first to seventh transistors T1 to T7 may include an input electrode (or a source electrode), an output electrode (or a drain electrode), and a control electrode (or a gate electrode). In the present specification, for the convenience of explanation, an input electrode, an output electrode, and a control electrode may be referred to as a first electrode, a second electrode, and a third electrode, respectively.

The first transistor T1 may be provided between the first voltage line VL1 and the light emitting element ED. In detail, the first transistor T1 includes a first electrode electrically connected to the first voltage line VL1, a second electrode electrically connected to the light emitting element ED, and a third electrode connected to the second node N2. The first transistor T1 may receive the first driving voltage ELVDD through the first voltage line VL1. The second electrode of the first transistor T1 may be electrically connected to an anode of the light emitting element ED via the sixth transistor T6.

The second transistor T2 may be connected between the i-th data line DLi and the first node N1. Specifically, the second transistor T2 includes a first electrode connected to the i-th data line DLi, a second electrode connected to the first node N1, and a third electrode to receive the j-th write scan signal GWj through the j-th write scan line GWLj. During a data write section, the second transistor T2 is turned on in response to the j-th write scan signal GWj provided to the j-th write scan line GWLj. The i-th data line DLi and the first node N1 may be electrically connected to each other by the turned-on second transistor T2, and the data voltage Vdata applied to the i-th data line DLi may be applied to the first node N1 through the turned-on second transistor T2.

The third transistor T3 is connected between the second electrode of the first transistor T1 and the third electrode of the first transistor T1. Specifically, the third transistor T3 includes a first electrode electrically connected to the second electrode of the first transistor T1, a second electrode electrically connected to the second node N2, and a third electrode to receive the j-th compensating scan signal GCj through the j-th compensating scan line GCLj. During a compensation section, the third transistor T3 is turned on in response to the j-th compensating scan signal GCj provided to the j-th compensating scan line GCLj. The first transistor T1 may be diode-connected by the third transistor T3 turned-on during the compensation section.

The fourth transistor T4 may be electrically connected between the second node N2 and the first initialization voltage line VIL1. Specifically, the fourth transistor T4 includes a first electrode electrically connected to the second node N2, a second electrode electrically connected to the first initialization voltage line VIL1 and a third electrode to receive the j-th initialization scan signal GIj through the j-th initialization scan line GILj. The first initialization voltage VINT may be applied to the first initialization voltage line VIL1. During an initialization section, the fourth transistor T4 is turned on, in response to the j-th initialization scan signal GCj provided to the j-th initialization scan line GCLj. The second node N2 may be initialized to the first initialization voltage VINT by the fourth transistor T4 turned on during the initialization section.

The fifth transistor T5 may be electrically connected between the first node N1 and the reference voltage line VRL. The fifth transistor T5 includes a first electrode connected to the reference voltage line VRL, a second electrode electrically connected to the first node N1, and a third electrode to receive the j-th compensating scan signal GCj through the j-th compensating scan line GCLj. During the compensation section, the fifth transistor T5 is turned on in response to the j-th compensating scan signal GCj provided to the j-th compensating scan line GCLj. The reference voltage line VRL and the first node N1 are electrically connected to each other by the fifth transistor T5 which is turned on. In other words, the reference voltage Vref may be applied to the first node N1 during the compensation section.

According to an embodiment of the present disclosure, the third electrodes of the third and fifth transistors T3 and, T5 are commonly connected to the j-th compensating scan line GCLj, but the present disclosure is not limited thereto. In other words, the third electrode of the third transistor T3 and the third electrode of the fifth transistor T5 may be connected to mutually different scan lines to receive mutually different scan signals.

The sixth transistor T6 is connected between the second electrode of the first transistor T1 and the anode of the light emitting element ED. In detail, the sixth transistor T6 includes a first electrode connected to the second electrode of the first transistor T1, a second electrode connected to an anode of the light emitting element ED, and a third electrode electrically connected to the j-th light emitting control line EMLj. The sixth transistor T6 may be turned on by the j-th light emitting control signal EMj provided to the j-th light emitting control line EMLj during an emission section.

The seventh transistor T7 is connected between the second initialization voltage line VIL2 and the anode of the light emitting element ED. Specifically, the seventh transistor T7 includes a first electrode connected to the anode of the light emitting element ED, a second electrode connected to the second initialization voltage line VIL2, and a third electrode to receive the j-th write scan signal GWj through the j-th write scan line GWLj. The second initialization voltage AINT may be applied to the second initialization voltage line VIL2. According to an embodiment of the present disclosure, the second initialization voltage AINT has a voltage level different that of the first initialization voltage VINT. During a black section, the seventh transistor T7 is turned on in response to the j-th write scan signal GWj provided to the j-th write scan line GWLj. During the black section, the anode of the light emitting element ED may be initialized to the second initialization voltage AINT by the turned-on seventh transistor T7.

The light emitting element ED may be electrically connected between the sixth transistor T6 and the second voltage line VL2. The anode of the light emitting element ED is connected to the second electrode of the sixth transistor T6, and the cathode of the light emitting element ED is connected to the second voltage line VL2. The second driving voltage ELVSS may be applied to the second voltage line VL2. The second driving voltage ELVSS has a level lower than that of the first driving voltage ELVDD. Accordingly, the light emitting element ED may emit light depending on a voltage corresponding to the difference between a signal received through the sixth transistor T6 and the second driving voltage ELVSS.

Figure 3A:
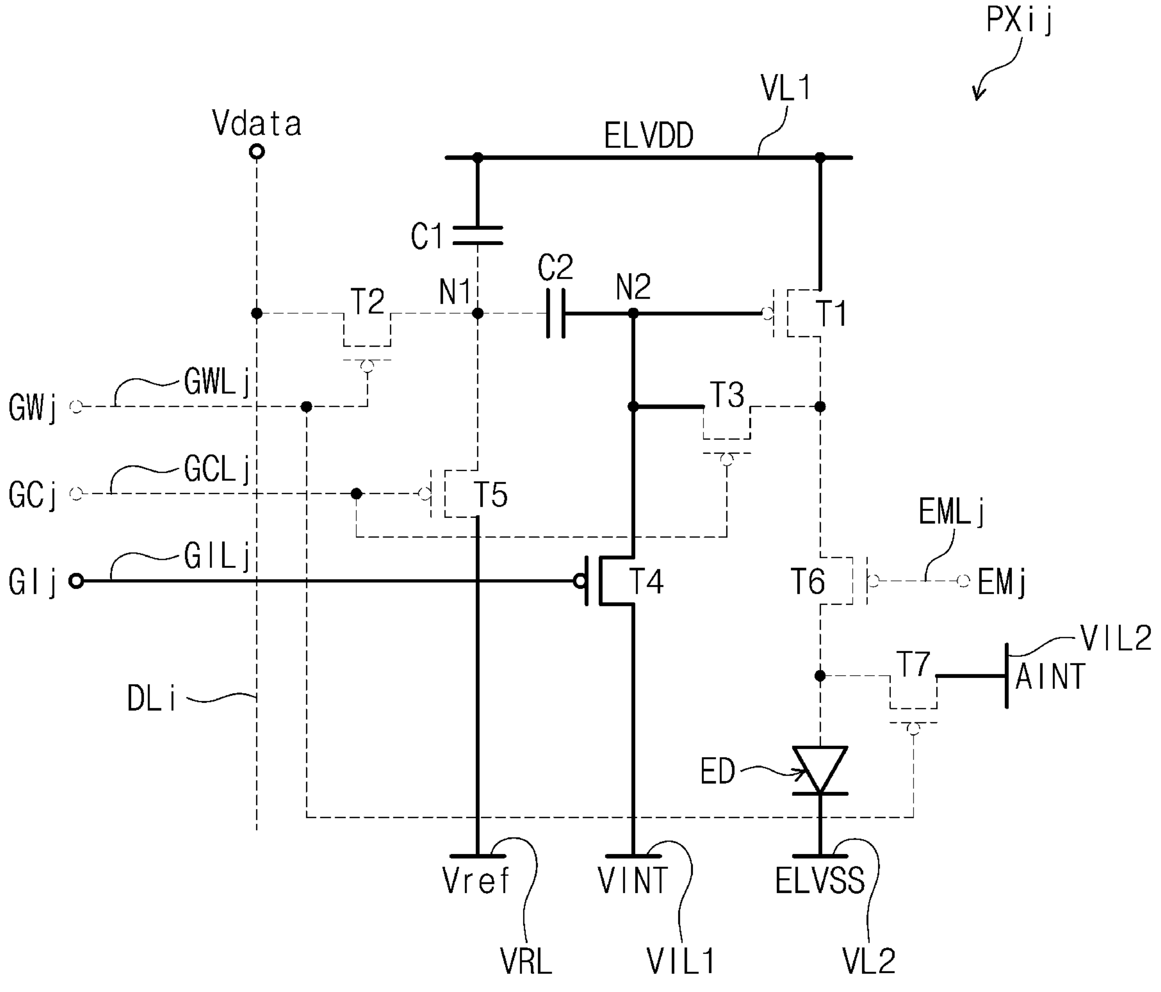
FIGS. 3A and 3B are views illustrating the operation of a pixel for a first section, according to an embodiment of the present disclosure.
Figure 3B:
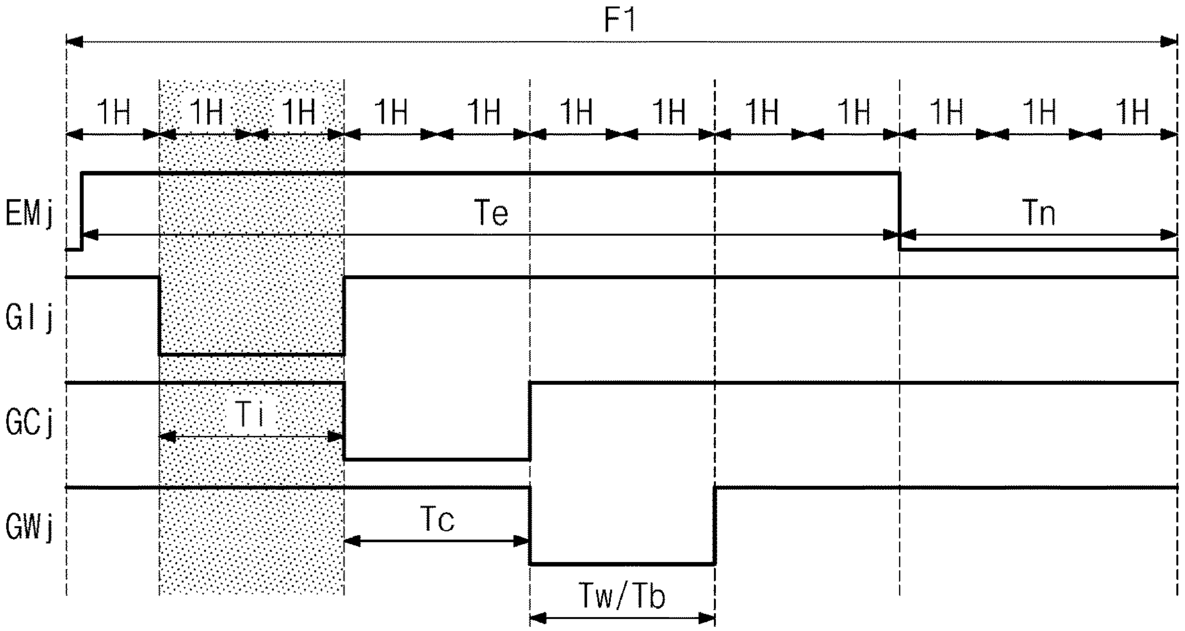

FIG. 3A is a circuit diagram illustrating the operation of a pixel during a first section (that is, an initialization section (Ti)) according to an embodiment of the present disclosure, and FIG. 3B is a view illustrating waveforms of scan signals during the first section of FIG. 3A.

Referring to FIGS. 3A and 3B, the display device DD (illustrated in FIG. 1) displays a unit image for each frame period. Each of the pixels PX illustrated in FIG. 1 receives a data voltage Vdata corresponding to each frame period.

FIG. 3B illustrate only one frame period F1 of a plurality of frame periods. Referring to FIG. 3B, although the operation of the pixel PXij is illustrated for the one frame period F1, other pixels operate similarly to the operation of the pixel PXij, for the one frame period F1. In addition, the pixels operate similarly to each other for another frame period.

The one frame period F1 may be divided into a non-emission section Te and an emission section Tn by the j-th light emitting control signal EMj. According to an embodiment of the present disclosure, the j-th light emitting control signal EMj has a high level during the non-emission section Te and has a low level during the emission section Tn. However, the case is limited to the case that the sixth transistor T6, which receives the j-th light emitting control signal EMj, is a PMOS transistor. When the sixth transistor T6 is an NMOS transistor, the j-th light emitting control signal EMj may have the low level during the non-emission section Te and the high level during the emission section Tn.

The j-th initialization scan signal GIj is activated for the non-emission section Te. According to an embodiment, although the signals illustrated in FIG. 3B are activated when the signals have the low level, the present disclosure is not limited thereto. In this case, the j-th initialization scan signal GIj may have the low level during an activation section, and the high level during a non-activation section. The low level of signals illustrated in FIG. 3B may be a turn-on voltage level of transistors which receive the signals. However, according to an embodiment, the high level of the signals illustrated in FIG. 3B may be a turn-on voltage level of the transistors which receive the signals, The activation section of the j-th initialization scan signal GIj may be defined as the first section (referred to as an initialization section Ti or a third activation section.) The j-th initialization scan signal GIj is supplied to the fourth transistor T4 through the j-th initialization scan line GILj, and the fourth transistor T4 is turned on during the initialization section Ti in which the j-th initialization scan signal GIj is activated. The potential at the second node N2 may be initialized to the first initialization voltage VINT by the fourth transistor T4, which is turned on, during the initialization section Ti.

The j-th compensating scan signal GCj and the j-th write scan signal GWj may also be activated during the non-emission section Te. The j-th compensating scan signal GCj and the j-th write scan signal GWj may be deactivated, and only the j-th initialization scan signal GIj may be activated, during the initialization section Ti. Herein, the activation section of the j-th compensating scan signal GCj may be defined as a second section (referred to as a compensation section Tc or a second activation section), and the activation section of the j-th write scan signal GWj is defined as a third section (referred to as a data write section Tw, a black section Tb, or a first activation section).

As illustrated in FIG. 3B, the initialization section Ti, the compensation section Tc, and the data write section Tw (or the black section Tb) are included in the non-emission section Te, and the initialization section Ti, the compensation section Tc, and the data write section Tw are not overlapped with each other. In addition, the initialization section Ti, the compensation section Tc, and the data write section Tw may have an equal width (or an equal duration). According to an embodiment of the present disclosure, each of the initialization section Ti, the compensation section Tc, and the data write section Tw may have the duration of '2H'. The duration of each of the initialization section Ti, the compensation section Tc, and the data write section Tw is not limited thereto. Each of the initialization section Ti, the compensation section Tc, and the data writing section Tw may have the duration of '3H' or more.

The j-th initialization scan signal GIj may be generated earlier than the j-th compensation scan signal GCj and the j-th write scan signal GWj, for the non-emission section Te. In other words, the initialization section Ti may precede the compensation section Tc and the data write section Tw (or the black section Tb). The initialization section Ti may be not overlapped with the compensation section Tc. When the j-th initialization scan signal GIj is deactivated and the initialization section Ti is terminated, the j-th compensation scan signal GCj may be activated such that the compensation section Tc may be started.

The j-th compensation scan signal GCj may be generated earlier than the j-th write scan signal GWj during the non-emission section Te. In other words, the compensation section Tc may precede the data write section Tw (or the black section Tb). The compensation section Tc may not be overlapped with the data write section Tw (or the black section Tb). When the j-th compensation scan signal GCj is deactivated and the compensation section Tc is terminated, the j-th write scan signal GWj may be activated such that the data write section Tw (or the black section Tb) is started.

Figure 4A:
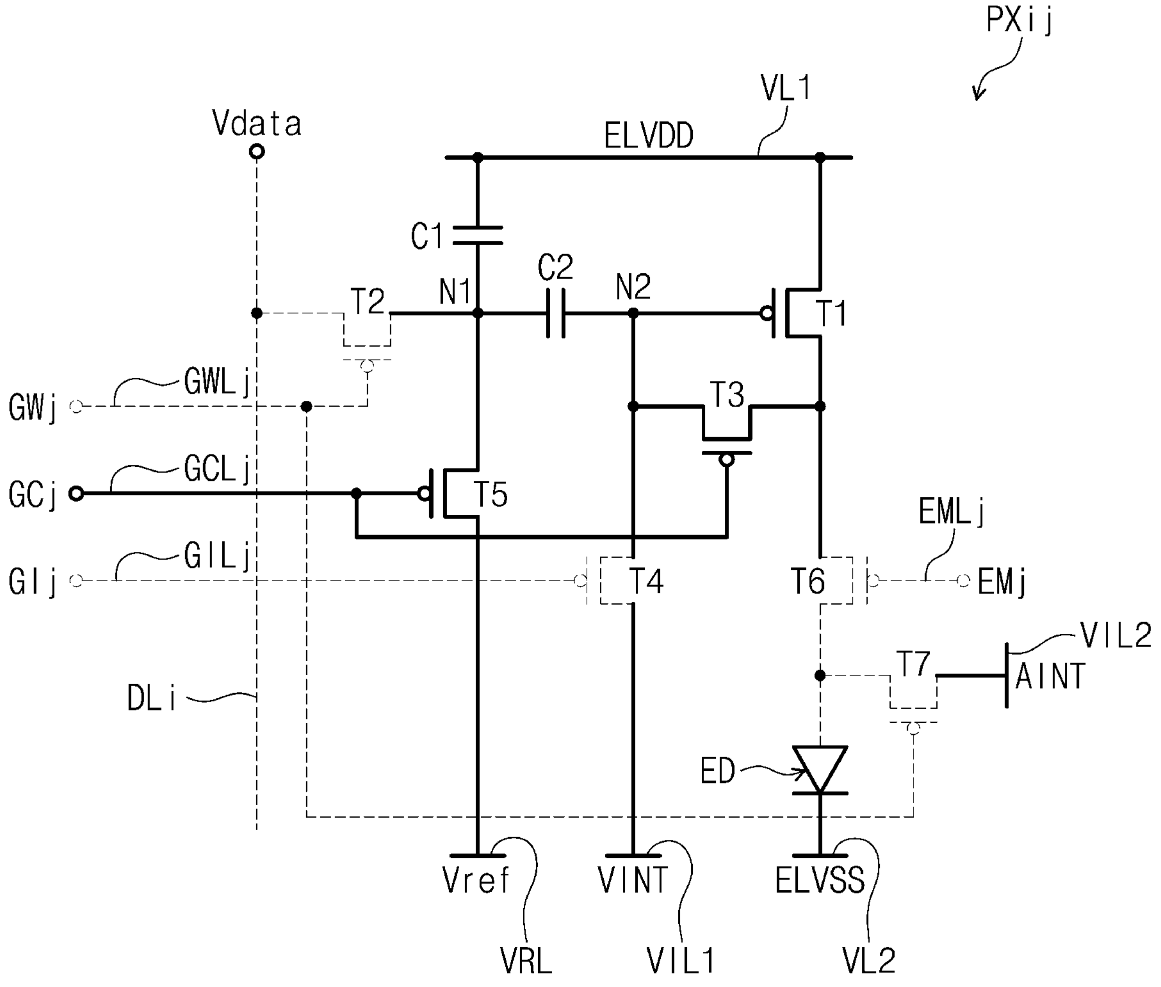
FIGS. 4A and 4B are views illustrating the operation of a pixel for a second section, according to an embodiment of the present disclosure.
Figure 4B:
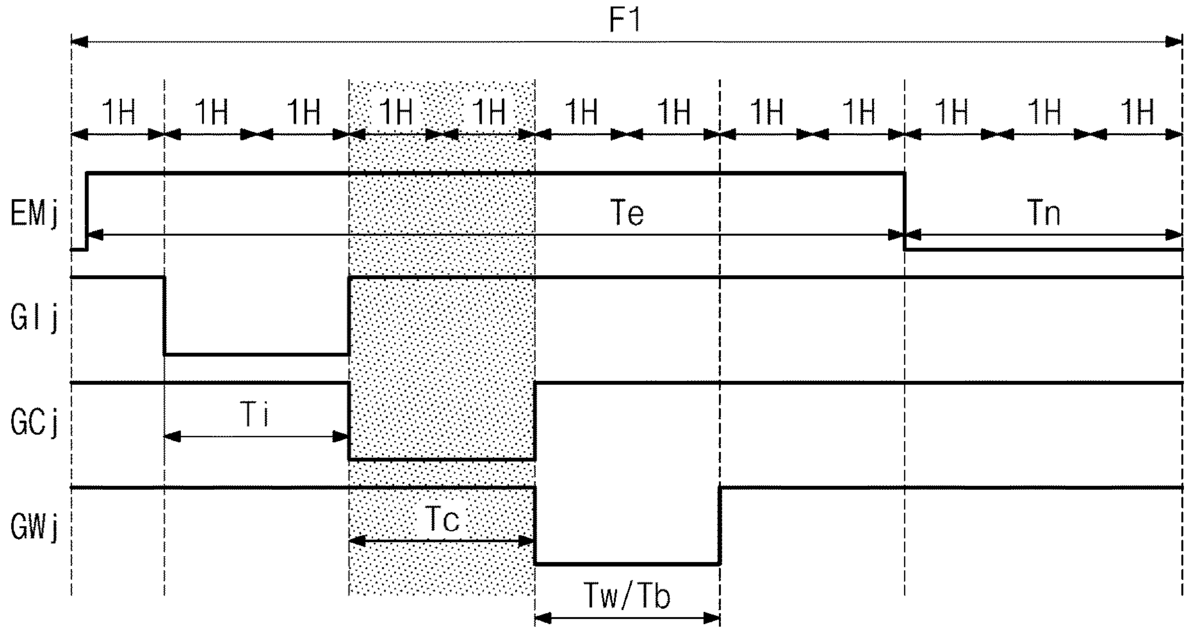

FIG. 4A is a circuit diagram illustrating the operation of a pixel for the second section (that is, the compensation section Tc) according to an embodiment of the present disclosure, and FIG. 4B is a view illustrating waveforms of scan signals for the second section of FIG. 4A.

Referring to FIGS. 4A and 4B, the j-th compensating scan signal GCj is activated during the non-emission section Te. In this case, the j-th compensation scan signal GCj may have a low level during the activation section (which is the compensation section Tc), and a high level during the non-activation section.

The j-th compensation scan signal GCj is supplied to the third and fifth transistors T3 and T5 through the j-th compensation scan line GCLj, and the third and fifth transistors T3 and T5 are turned on during the compensation section Tc that the j-th compensation scan signal GCj is activated. During the compensation section Tc, the first transistor T1 is diode-connected by the turned-on third transistor T3 and biased in the forward direction. Then, the compensating voltage "ELVDD-Vth", which is obtained by subtracting the threshold voltage Vth of the first transistor Ti from the first power supply voltage ELVDD, may be applied to the second node N2. In other words, the potential of the second node N2 may be compensated by the compensating voltage "ELVDD-Vth" during the compensation section Tc.

In addition, the reference voltage Vref is applied to the first node N1 through the fifth transistor T5 turned on, during the compensation section Tc.

The compensation section Tc may generate earlier than the data write section Tw (or the black section Tb). When the j-th compensation scan signal GCj is deactivated and the compensation section Tc is terminated, the j-th write scan signal GWj may be activated.

Figure 5A:
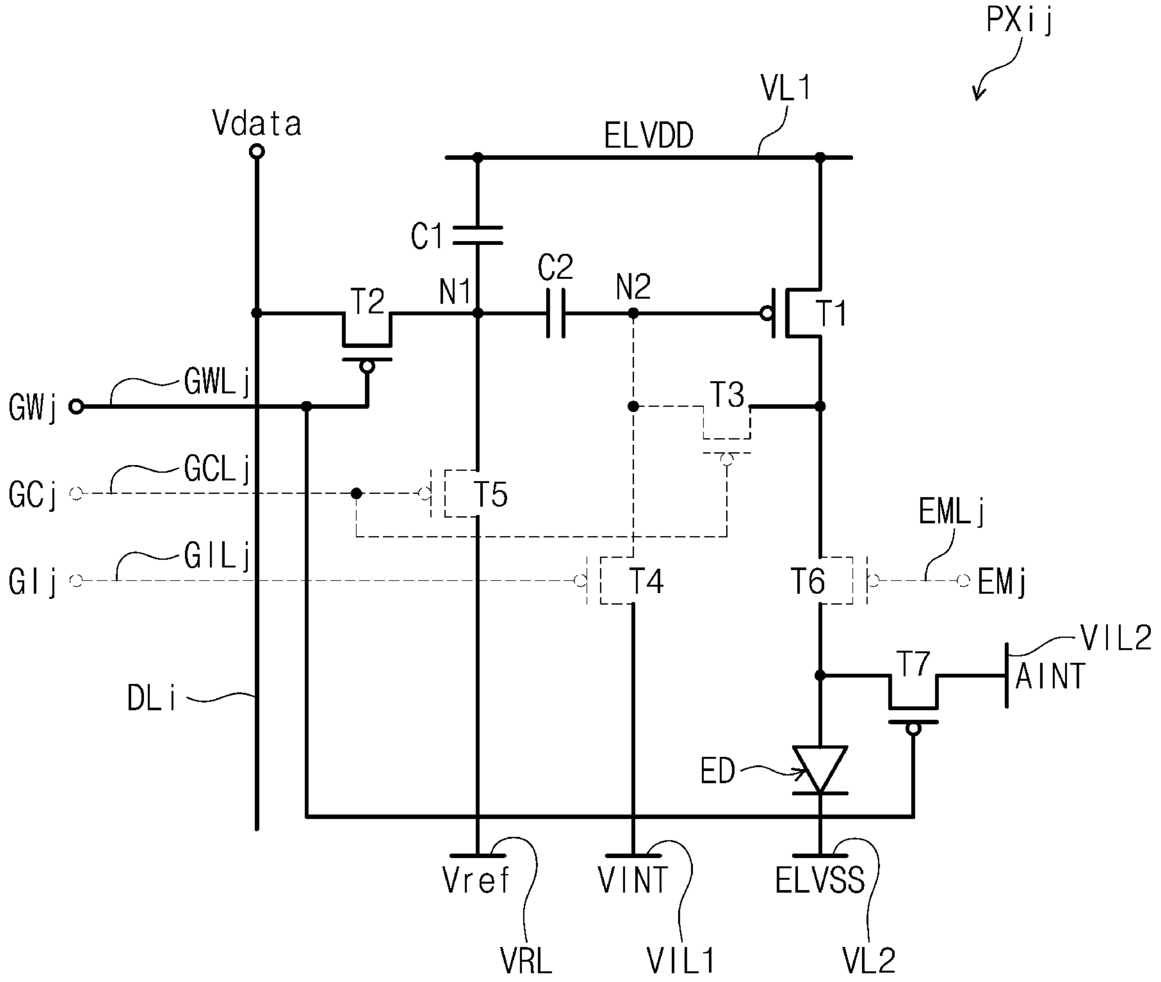
FIGS. 5A and 5B are views illustrating the operation of a pixel for a third section, according to an embodiment of the present disclosure.
Figure 5B:
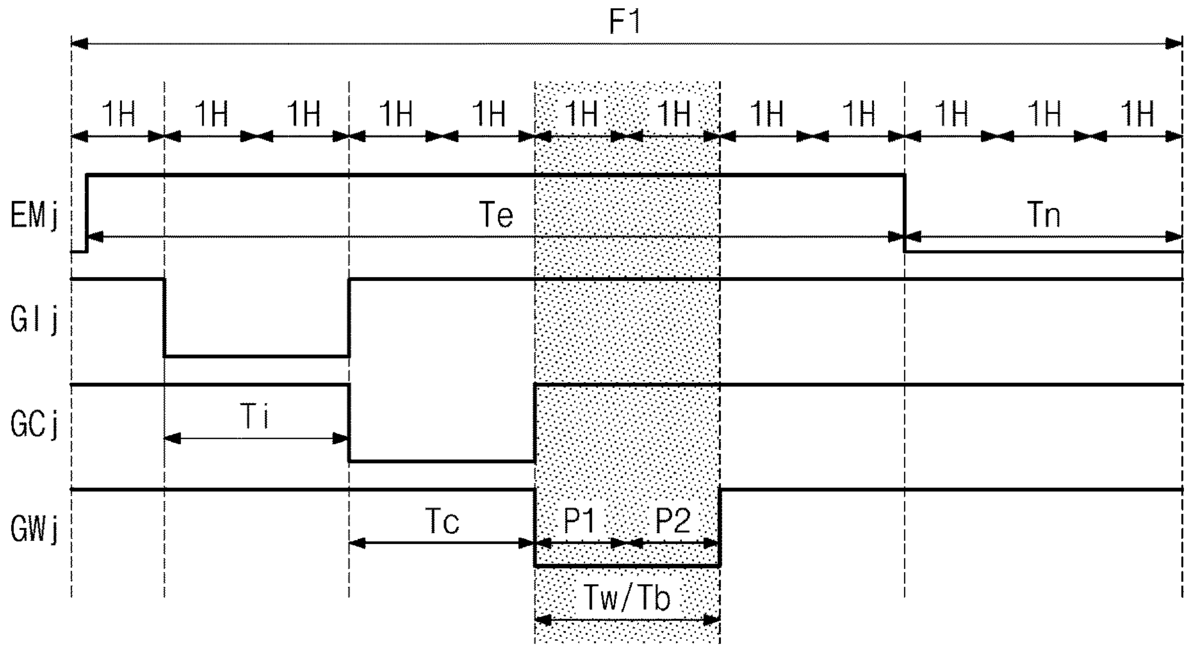

FIG. 5A is a circuit diagram illustrating the operation of a pixel during the third section (that is, the data write section Tw or the black section Tb), according to an embodiment of the present disclosure, and FIG. 5B is a view illustrating waveforms of scan signals during the third section of FIG. 5A.

Referring to FIGS. 5A and 5B, the j-th write scan signal GWj is activated during the non-emission section Te. In this case, the j-th write scan signal GWj may have a low level during the activation section (which is the data write section Tw), and has a high level during the non-activation section.

The j-th write scan signal GWj is supplied to the second transistor T2 through the j-th write scan line GWLj, and the second transistor T2 is turned on during the data write section Tw that the j-th write scan signal GWj is activated. The data write section Tw includes a first write section P1 and a second write section P2. The first write section P1 is a section that a previous data voltage supplied to the i-th data line DLi is supplied, and the second write section P2 is a section that a present data voltage Vdata is supplied. The first write section P1 may be referred to as a pre-charging section, and the second write section P2 may be referred to as an actual write section. The current data voltage Vdata may be applied to the first node N1 through the turned-on second transistor T2. Then, the potential of the first node N1 is changed from the reference voltage Vref to the data voltage Vdata. That is, the amount of change in the potential of the first node N1 is defined as "Vdata-Vref".

During the data write section Tw, when the potential at the first node N1 is changed from the reference voltage Vref to the data voltage Vdata, the potential at the second node N2 is changed from the compensating voltage "ELVDD-Vth" to the gate voltage "ELVDD-Vth+Vdata−Vref" through the coupling of the second capacitor C2.

The black section Tb may be the same as the data write section Tw. The data write section Tw and the black section Tb may be simultaneously started and terminated. The seventh transistor T7 is turned on by the j-th write scan signal GWj activated during the black section Tb. During the black section Tb, the second initialization voltage AINT supplied to the second initialization voltage line VIL2 may be applied to the anode of the light emitting element ED through the turned-on seventh transistor T7. Then, the anode of the light emitting element ED may be initialized to the second initialization voltage AINT. When the anode of the light emitting element ED is initialized to the second initialization voltage AINT during the black section Tb, black characteristics of the pixel PXij may be improved. In other words, a phenomenon, in which the light emitting element ED emits light due to a current leaked from the first transistor T1, may be prevented, such that the pixel PXij may accurately display a black gray scale.

Thereafter, when the j-th light emitting control signal EMj is activated during the emission section Tn, the sixth transistor T6 is turned on. Then, a driving current may flow between the first transistor T1 and the light emitting element ED. Accordingly, during the emission section Tn, the light emitting element ED may output light corresponding to the driving current.

According to an embodiment of the present disclosure, the j-th initialization scan signal GIj, the j-th compensating scan signal GCj, and the j-th write scan signal GWj may be scan signals output from one scan driver 300 illustrated in FIG. 1. Accordingly, the j-th initialization scan signal GIj, the j-th compensating scan signal GCj, and the j-th write scan signal GWj may be scan signals sequentially output from the scan driver 300. For example, the j-th initialization scan signal GIj may be a j-th scan signal output from the scan driver 300, the j-th compensating scan signal GCj may be a (j+2)-th scan signal output from the scan driver 300, and the j-th write scan signal GWj may be a (j+4)-th scan signal output from the scan driver 300. Since the j-th initialization scan signal GIj, the j-th compensating scan signal GCj, and the j-th write scan signal GWj are scan signals output from one scan driver 300, each activation section may have an equal width (i.e., an equal duration).

As described above, as the scan signals output from one scan driver 300 are used as the j-th initialization scan signal GIj, the j-th compensation scan signal GCj, and the j-th write scan signal GWj, the number of scan drivers may be prevented from increasing. Accordingly, the width of the non-emission region NDA of the display panel DP may be prevented from being increased due to the increase in the number of the scan drivers.

Figure 6A:
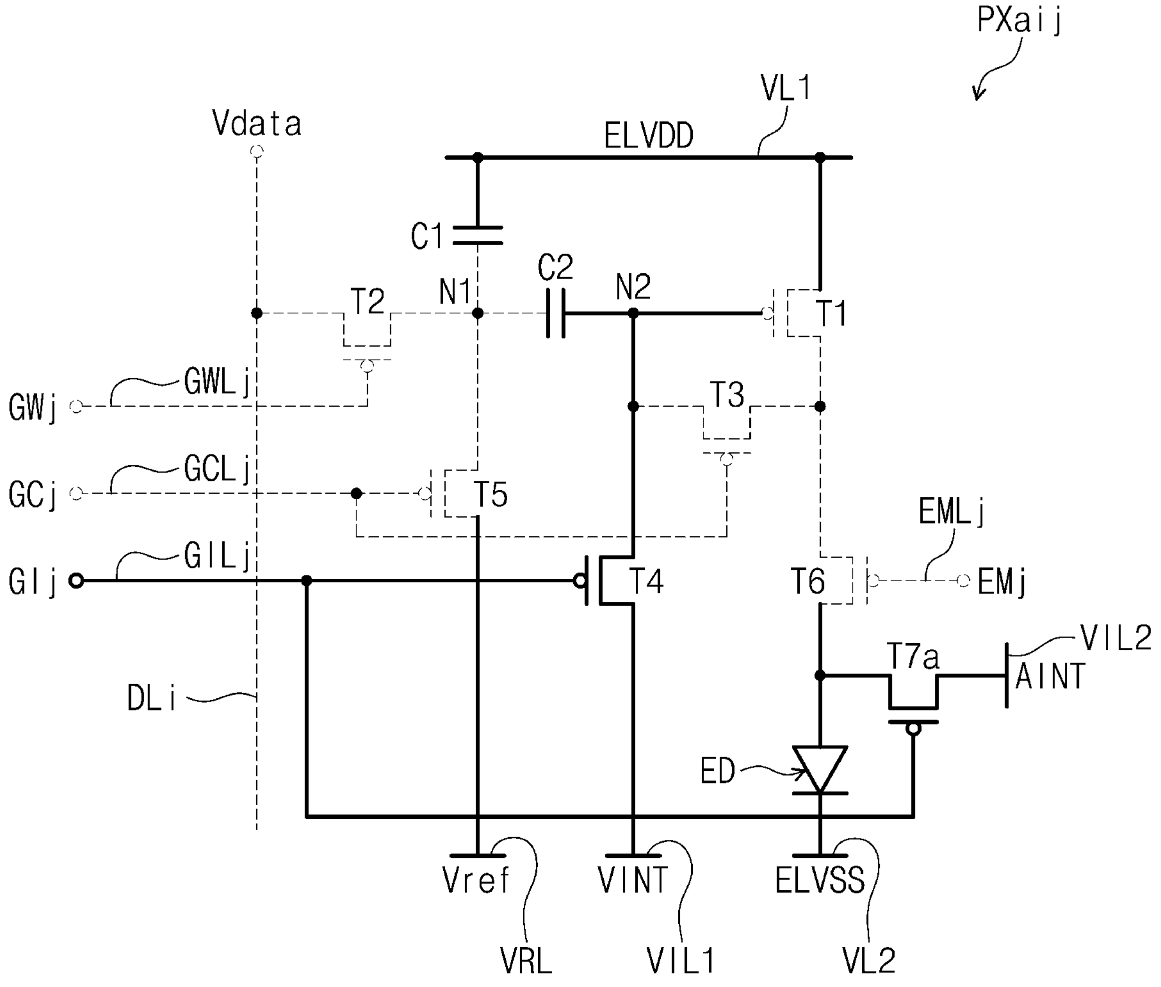
FIGS. 6A and 6B are views illustrating the operation of a pixel for a first section, according to an embodiment of the present disclosure.
Figure 6B:
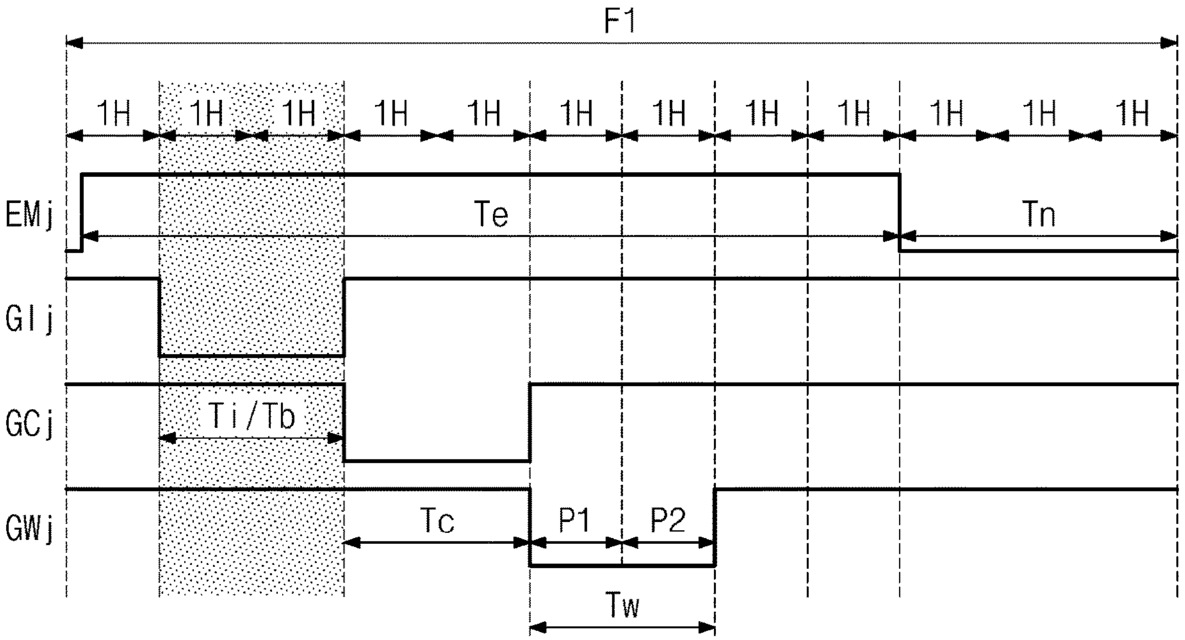

FIGS. 6A and 6B are views illustrating the operation of a pixel during one section, according to an embodiment of the present disclosure.

Referring to FIGS. 6A and 6B, a seventh transistor T7*a* is connected between the second initialization voltage line VIL2 and the anode of the light emitting element ED. Specifically, the seventh transistor T7*a* includes a first electrode connected to the anode of the light emitting element ED, a second electrode connected to the second initialization voltage line VIL2, and a third electrode to receive the j-th initialization scan signal GIj through the j-th initialization scan line GILj.

The activation section (i.e., the third activation section) of the j-th initialization scan signal GIj may be defined as a first section (or an initialization section Ti or a black section Tb). The j-th initialization scan signal GIj is supplied to the fourth transistor T4 and the seventh transistor T7*a* through the j-th initialization scan line GILj, and the fourth transistor T4 and the seventh transistor T7*a* are turned on during the initialization section Ti that the j-th initialization scan signal GIj is activated. The potential of the second node N2 may be initialized to the first initialization voltage VINT by the fourth transistor T4 turned on, during the initialization section Ti. During the black section Tb, the anode of the light emitting element ED may be initialized to the second initialization voltage AINT by the turned-on seventh transistor T7*a*.

The black section Tb may be the same as the initialization section Ti. The initialization section Ti and the black section Tb may be simultaneously started and terminated. The seventh transistor T7*a* is turned on by the j-th initialization scan signal GIj activated for the black section Tb. During the black section Tb, the second initialization voltage AINT supplied to the second initialization voltage line VIL2 may be applied to the anode of the light emitting element ED through the turned-on seventh transistor T7*a*. Then, the anode of the light emitting element ED may be initialized to the second initialization voltage AINT. When the anode of the light emitting element ED is initialized to the second initialization voltage AINT during the black section Tb, black characteristics of the pixel PXij may be improved. In other words, a phenomenon, in which the light emitting element ED emits light due to a current leaked from the first transistor Ti, may be prevented, and the pixel PXij may accurately display a gray scale.

The j-th compensating scan signal GCj and the j-th write scan signal GWj may be activated during the non-emission section Te. The j-th compensating scan signal GCj and the j-th write scan signal GWj may be deactivated, and only the j-th initialization scan signal GIj may be activated during the initialization section Ti. In this case, the activation section (i.e., a second activation section) of the j-th compensating scan signal GCj is defined as a second section (or a compensation section Tc), and the activation section (i.e., a first activation section) of the j-th write scan signal GWj is defined as a third section (or a data write section Tw)

As illustrated in FIG. 6B, the initialization section Ti (or the black section Tb), the compensation section Tc, and the data write section Tw are included in the non-emission section Te, and the initialization section Ti (or the black section Tb), the compensation section Tc, and the data write section Tw are not overlapped with each other. In addition, each of the initialization section Ti (or the black section Tb), the compensation section Tc, and the data write section Tw may have an equal width (or an equal duration). According to an embodiment of the present disclosure, the initialization section Ti (or the black section Tb), the compensation section Tc, and the data write section Tw may have the duration of '2H'.

Although FIGS. 6A and 6B illustrate that the seventh transistor T7*a* is turned on by the j-th initialization scan signal GIj, the present disclosure is not limited thereto. Alternatively, the seventh transistor T7*a* may be turned on by the j-th compensating scan signal GCj. In this case, the black section Tb may be the same as the compensation section Tc. The compensation section Tc and the black section Tb may be simultaneously started and terminated.

According to an embodiment of the present disclosure, the j-th initialization scan signal GIj, the j-th compensating scan signal GCj, and the j-th write scan signal GWj may be scan signals output from one scan driver 300 illustrated in FIG. 1. For example, the j-th initialization scan signal GIj may be a j-th scan signal output from the scan driver 300, the j-th compensating scan signal GCj may be a (j+2)-th scan signal output from the scan driver 300, and the j-th write scan signal GWj may be a (j+4)-th scan signal output from the scan driver 300.

As described above, the scan signals output from one scan driver are used as the j-th initialization scan signal GIj, the j-th compensating scan signal GCj, and the j-th write scan signal GWj, thereby preventing the number of scan drivers from being increased. Accordingly, the width of the non-display region NDA of the display panel DP may be prevented from being increased due to the increase in the number of scan drivers.

Figure 7:
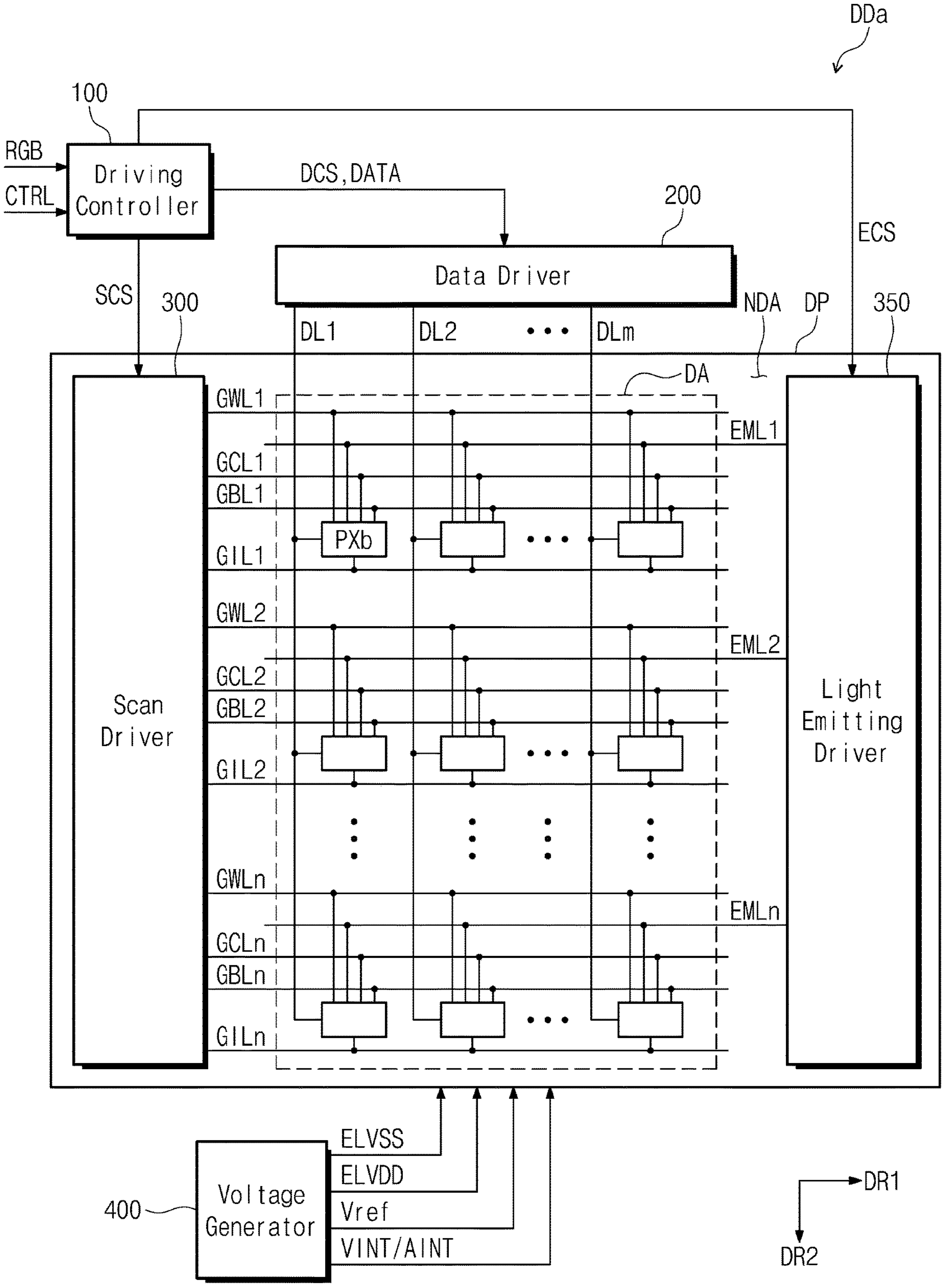
FIG. 7 is a block diagram of a display device, according to an embodiment of the present disclosure.

FIG. 7 is a block diagram of a display device, according to an embodiment of the present disclosure. However, the same reference numerals are given to the same components as those shown in FIG. 1 among the components shown in FIG. 7, and thus a detailed description thereof will be omitted to avoid redundancy.

Referring to FIG. 7, according to an embodiment of the present disclosure, a plurality of pixels PXb in a display device DDa are electrically connected to initialization scan lines GIL1 to GILn, compensating scan lines GCL1 to GCLn, write scan lines GWL1 to GWLn, black scan lines GBL1 to GBLn, light emitting control lines EML1 to EMLn, the data lines DL1 to DLm. Each of the plurality of pixels PXb may be electrically connected to four scan lines and one light emitting control lines. For example, as illustrated in FIG. 7, a first row of the pixels PXb may be connected to a first initialization scan line GILL a first compensating scan line GCL1, a first write scan line GWL1, a first black scan line GBL1, and a first light emitting control line EML1. In addition, a second row of the pixels PXb may be connected to a second initialization scan line GIL2, a second compensating scan line GCL2, a second write scan line GWL2, a second black scan line GBL2, and a second light emitting control line EML2. However, the number of scan lines and light emitting control lines, which are connected to each pixel PXb, is not limited thereto, but the number of scan lines and the number of light emitting control lines may be variable.

According to an embodiment of the present disclosure, the first compensating scan line GCL1 may be electrically connected to the third initialization scan line, and the first write scan line GWL1 may be electrically connected to the third compensating scan line and the fifth initialization scan line. The first black scan line GBL1 may be electrically connected to the sixth initialization scan line, the fourth compensating scan line, and the second write scan line GWL2. A first scan signal output through a first output terminal of the scan driver 300 are supplied to the first initialization scan line GIL1 while functioning as a first compensating scan signal. A third scan signal output through a third output terminal of the scan driver 300 are supplied to the first compensating scan line GCL1 and the third initialization scan line, while functioning as the first compensating scan signal and the third initialization scan signal. A fifth scan signal output through a fifth output terminal of the scan driver 300 are supplied to the first write scan line GWL1, the third compensating scan line, and the fifth initialization scan line, while functioning as the first write scan signal, the third compensating signal, and the fifth initialization scan signal. A sixth scan signal output through a sixth output terminal of the scan driver 300 are supplied to the second write scan line GWL2, the fourth compensating scan line, and the sixth initialization scan line, while functioning as the first write scan signal, the third compensating signal, and the fifth initialization scan signal.

Accordingly, although four scan lines are connected to each pixel PXb, the four scan lines may receive the four scan signals output from one scan driver 300 while functioning as an initialization scan signal, a compensating scan signal, a write scan signal, and a black scan signal.

Figure 8A:
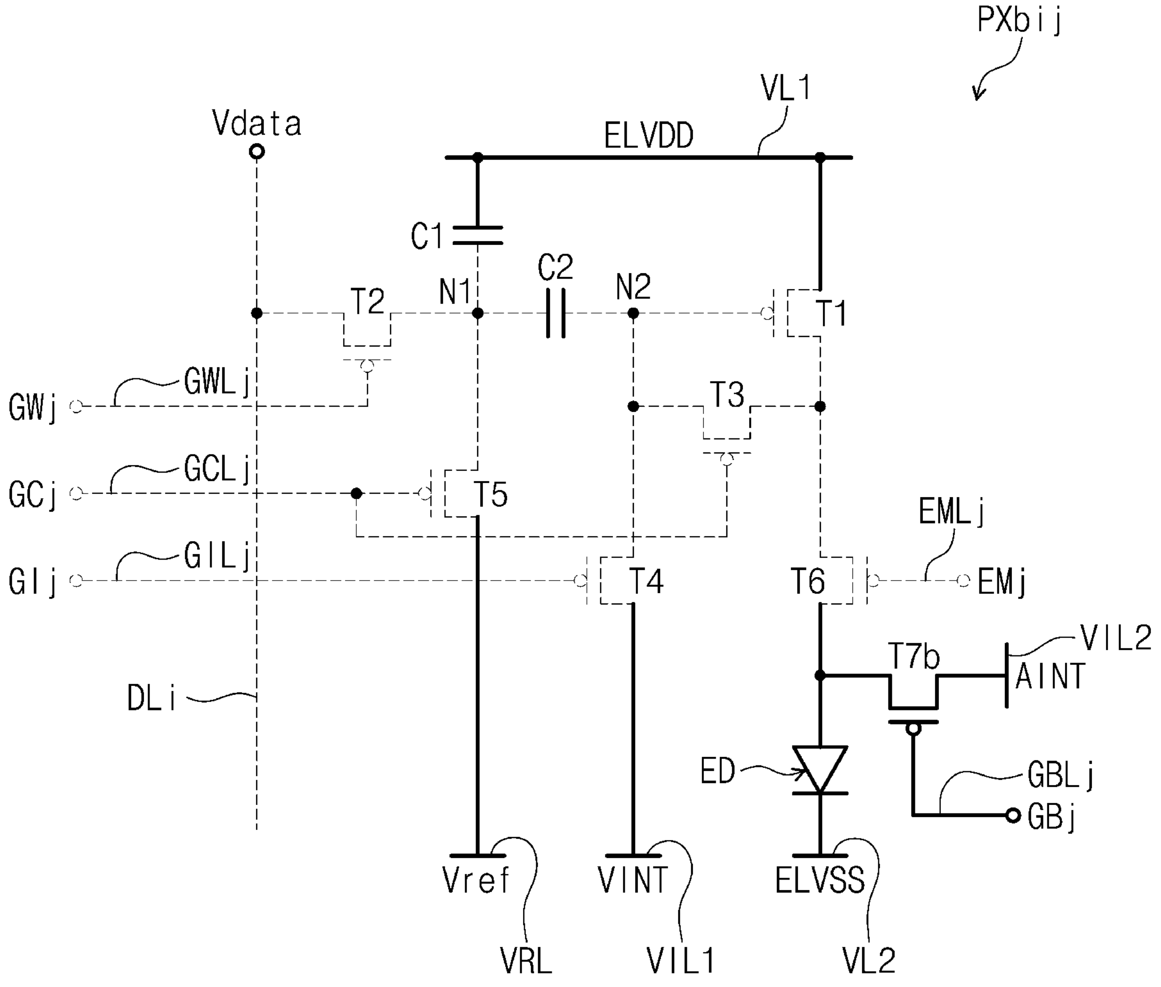
FIGS. 8A and 8B are views illustrating the operation of a pixel for a third section and a fourth section, according to an embodiment of the present disclosure.

Each of the plurality of pixels PXb may have a circuit configuration the same as that of the pixel circuit unit PXC illustrated in FIG. 2, except for a seventh transistor T7*b* (see FIG. 8A).

Figure 8B:
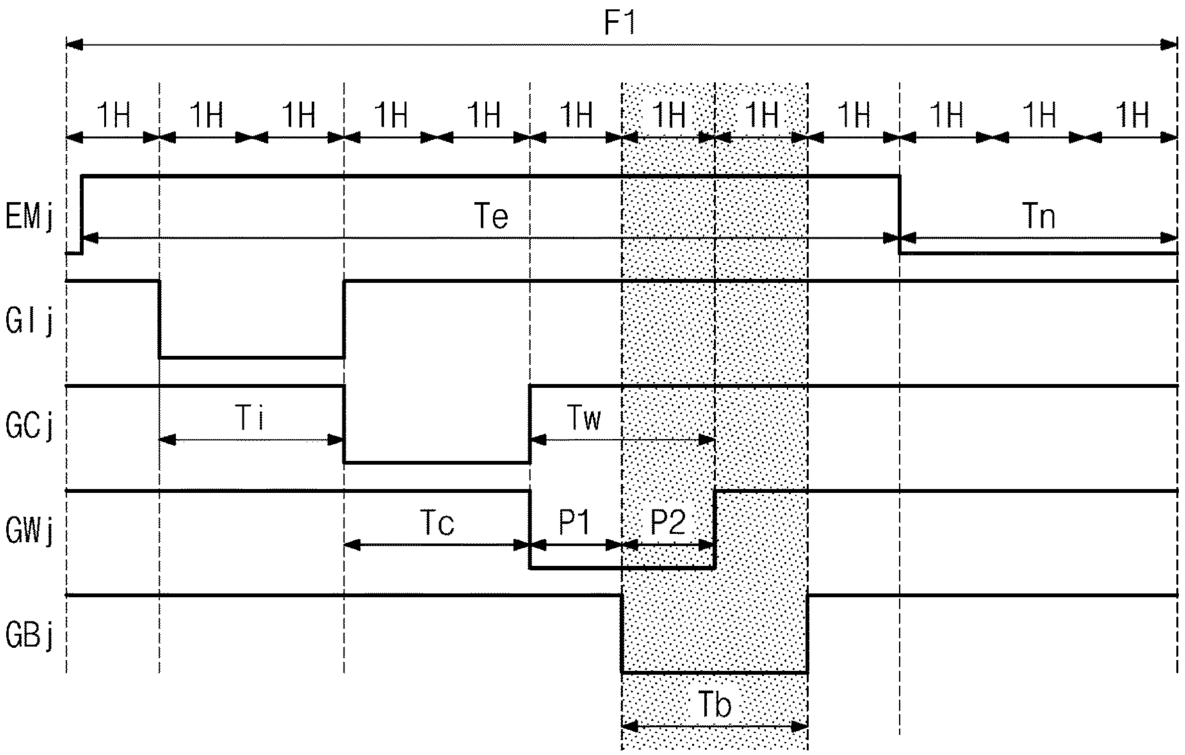

FIGS. 8A and 8B are views illustrating the operation of a pixel for a third section and a fourth section, according to an embodiment of the present disclosure.

Referring to FIGS. 8A and 8B, according to an embodiment of the present disclosure, the j-th black scan signal GBj (referred to as the fourth scan signal) in the pixel PXbij is activated for the non-emission section Te. In this case, the j-th black scan signal GBj may have a low level for an activation section (the black section Tb or the fourth activation section) and may have a high level during a non-activation section.

The j-th black scan signal GBj is supplied to the seventh transistor T7*b* through the j-th black scan line GBLj, and the seventh transistor T7*b* is turned on during the black section Tb for which the j-th black scan signal GBj is activated.

For the black section Tb, the second initialization voltage AINT supplied to the second initialization voltage line VIL2 may be applied to the anode of the light emitting element ED through the turned-on seventh transistor T7*b*. Then, the anode of the light emitting element ED may be initialized to the second initialization voltage AINT. When the anode of the light emitting element ED is initialized to the second initialization voltage AINT during the black section Tb, black characteristics of the pixel PXbij may be improved. In other words, a phenomenon, in which the light emitting element ED emits light due to a current leaked from the first transistor Ti, may be prevented, and the pixel PXbij may accurately display a black gray scale.

As illustrated in FIG. 8B, the initialization section Ti, the compensation section Tc, the data write section Tw, and the black section Tb are included in the non-emission section Te, and the initialization section Ti, the compensation section Tc, and the data write section Tw are not overlapped with each other. In addition, the data write section Tw and the black section Tb may be partially overlapped with each other.

In addition, each of the initialization section Ti, the compensation section Tc, the data write section Tw, and the black section Tb may have an equal width (or an equal duration). According to an embodiment of the present disclosure, the initialization section Ti, the compensation section Tc, and the data write section Tw, and the black section Tb may have the duration of '2H'. In addition, the data write section Tw and the black section Tb may be overlapped with each other by the duration of '1H'.

The j-th initialization scan signal GIj may be generated earlier than the j-th compensating scan signal GCj, the j-th write scan signal GWj, and the j-th black scan signal GBj during the non-emission section Te. In other words, the initialization section Ti may precede the compensation section Tc, the data write section Tw, and the black section Tb. The initialization section Ti may not be overlapped with the compensation section Tc. When the j-th initialization scan signal GIj is deactivated and the initialization section Ti is terminated, the j-th compensation scan signal GCj may be activated such that the compensation section Tc is started.

The j-th compensation scan signal GCj may be generated earlier than the j-th write scan signal GWj and the j-th black scan signal GBj for the non-emission section Te. In other words, the compensation section Tc may occur earlier than the data write section Tw, and the black section Tb. The compensation section Tc may not be overlapped with the data write section Tw and the black section Tb. When the j-th compensation scan signal GCj is deactivated and the compensation section Tc is terminated, the j-th write scan signal GWj may be activated such that the data write section Tw may be started. The data write section Tw includes a first write section P1 and a second write section P2. The first write section P1 is a section that a previous data voltage supplied to the i-th data line DLi is supplied, and the second write section P2 is a section that a present data voltage Vdata is supplied. The first write section P1 may be referred to as a pre-charging section, and the second write section P2 may be referred to as an actual write section.

The j-th write scan signal GWj may be generated earlier than the j-th black scan signal GBj during the non-emission section Te. In other words, the data write section Tw may be started earlier than the black section Tb. In addition, the data write section Tw and the black section Tb may be partially overlapped with each other. The j-th black scan signal GBj is activated such that the black section Tb is started, before the j-th write scan signal GWj is deactivated such that the data write section Tw is terminated. According to an embodiment of the present disclosure, the second write section P2 may be overlapped with the black section Tb. However, the present disclosure is not limited thereto. In addition, the data write section Tw and the black section Tb may be partially overlapped with each other. In other words, when the data write section Tw is terminated, the black section Tb may be started.

Each of the scan signals output from the scan driver 300 (see FIG. 7) may have the activation section of 2H, and the scan signals adjacent to each other may be overlapped with each other by the duration of '1H'.

According to an embodiment of the present disclosure, the j-th initialization scan signal GIj, the j-th compensating scan signal GCj, the j-th write scan signal GWj, and the j-th black scan signal GBj may be scan signals output from one scan driver 300 illustrated in FIG. 7. For example, the j-th initialization scan signal GIj may be a j-th scan signal output from the scan driver 300, the j-th compensating scan signal GCj may be a (j+2)-th scan signal output from the scan driver 300. In addition, the j-th write scan signal GWj may be a (j+4)-th scan signal output from the scan driver 300, and the j-th black scan signal GBj may be a (j+5)-th scan signal output from the scan driver 300.

As described above, the scan signals output from one scan driver 300 are used as the j-th initialization scan signal GIj, the j-th compensating scan signal GCj, the j-th write scan signal GWj, and the j-th black scan signal GBj, thereby preventing the number of scan drivers from being increased. Accordingly, the width of the non-display region NDA of the display panel DP may be prevented from being increased due to the increase in the number of the scan drivers 300

According to an embodiment, the first to third scan signals supplied to the pixel may include first to third activation sections, and the first to third activation sections have an equal section. Accordingly, the first to third scan signals may be generated by using one scan driver. Accordingly, the number of scan drivers disposed in the non-display region of the display panel may be reduced, thereby preventing the width of the non-display region of the display panel from being increased.

Although an embodiment of the present disclosure has been described for illustrative purposes, those skilled in the art will appreciate that various modifications, and substitutions are possible, without departing from the scope and spirit of the invention as disclosed in the accompanying claims. Accordingly, the technical scope of the present disclosure is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a pixel; and a scan driver configured to provide a first scan signal, a second scan signal and a third scan signal to the pixel, wherein the pixel includes:

a light emitting element;

a first transistor connected between a first voltage line, which is to receive a first driving voltage, and the light emitting element;

a first capacitor connected between the first voltage line and a first node;

a second capacitor between the first node and a second node;

a second transistor connected between a data line and the first node, a gate electrode of the second transistor to receive the first scan signal from the scan driver;

a third transistor connected between the second node and the first transistor, a gate electrode of the third transistor to receive the second scan signal from the scan driver; and a fourth transistor connected between a first initialization voltage line, which is to receive a first initialization voltage, and the second node, a gate electrode of the fourth transistor to receive the third scan signal from the scan driver, wherein the first scan signal includes a first activation section, the second scan signal includes a second activation section, and the third scan signal includes a third activation section, and wherein the first activation section, the second activation section and third activation sections have an equal duration.

2. The display device of claim 1, wherein the first activation section, the second activation section and the third activation section are not overlapped with each other.

3. The display device of claim 2, wherein the third activation section precedes the second activation section, and wherein the second activation section precedes the first activation section.

4. The display device of claim 3, wherein the first activation section includes:

a first write section to receive a previous data voltage through the data line; and a second write section to receive a present data voltage through the data line.

5. The display device of claim 1, wherein the pixel further includes:

a fifth transistor connected between a reference voltage line, which is to receive a reference voltage, and the first node, a gate electrode of the fifth transistor to receive the second scan signal.

6. The display device of claim 1, further comprising:

a light emitting driver to provide a light emitting control signal to the pixel, wherein the pixel further includes:

a sixth transistor connected between the first transistor and the light emitting element, a gate electrode of the sixth transistor receives the light emitting control signal from the light emitting driver.

7. The display device of claim 6, wherein the light emitting control signal includes:

an emission section; and a non-emission section, and wherein the first activation section, the second activation section and the third activation sections are overlapped with the non-emission section.

8. The display device of claim 1, wherein the pixel further includes:

a seventh transistor connected between a second initialization voltage line, which is to receive a second initialization voltage, and the light emitting element, a gate electrode of the seventh transistor to receive the first scan signal from the scan driver.

9. The display device of claim 8, wherein the first activation section, the second activation section and the third activation section are not overlapped with each other.

10. The display device of claim 9, wherein the third activation section precedes the second activation section, and wherein the second activation section precedes the first activation section.

11. The display device of claim 8, wherein the first initialization voltage has a voltage level different from a voltage level of the second initialization voltage.

12. The display device of claim 1, wherein the pixel further includes:

a seventh transistor connected between a second initialization voltage line, which is to receive a second initialization voltage, and the light emitting element, a gate electrode of the seventh transistor to receive the third scan signal from the scan driver.

13. The display device of claim 12, wherein the first activation section, the second activation section and the third activation section are not overlapped with each other.

14. The display device of claim 13, wherein the third activation section precedes the second activation section, and wherein the second activation section precedes the first activation section.

15. The display device of claim 12, wherein the first initialization voltage has a voltage level different from a voltage level of the second initialization voltage.

16. The display device of claim 1, wherein the scan driver further outputs a fourth scan signal, and wherein the pixel further includes:

a seventh transistor connected between a second initialization voltage line, which is to receive a second initialization voltage, and the light emitting element, a gate electrode of the seventh transistor to receive the fourth scan signal from the scan driver.

17. The display device of claim 16, wherein the fourth scan signal has a fourth activation section, and wherein the fourth activation section has a duration equal to the duration of the first to third activation sections.

18. The display device of claim 17, wherein the first activation section includes:

a first write section to receive a previous data voltage through the data line; and a second write section to receive a present data voltage through the data line, and wherein the fourth activation section is overlapped with the second write section.

19. The display device of claim 18, wherein the third activation section precedes the fourth activation duration.

20. The display device of claim 17, wherein the first activation section, the second activation section, and the third activation section are not overlapped with each other, and wherein the third activation section precedes the second activation section, and wherein the second activation section precedes the first activation section.

* * * * *